(12) United States Patent
Sugimoto

(10) Patent No.: US 9,058,144 B2
(45) Date of Patent: Jun. 16, 2015

(54) IMAGE TRANSMISSION SYSTEM FACILITATING ADDRESS REGISTRATION

(71) Applicant: Kyocera Document Solutions Inc., Osaka (JP)

(72) Inventor: Kensaku Sugimoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/166,191

(22) Filed: Jan. 28, 2014

(65) Prior Publication Data

US 2014/0211251 A1   Jul. 31, 2014

(30) Foreign Application Priority Data

Jan. 31, 2013   (JP) ................... 2013-016693

(51) Int. Cl.
| | | |
|---|---|---|
| *G06F 3/12* | (2006.01) | |
| *H04N 1/00* | (2006.01) | |
| *G06K 15/00* | (2006.01) | |
| *G06F 15/16* | (2006.01) | |
| *H04L 29/12* | (2006.01) | |

(52) U.S. Cl.
CPC .......... *G06F 3/1285* (2013.01); *H04N 1/00214* (2013.01); *H04N 1/00344* (2013.01); *H04N 2201/0012* (2013.01); *H04N 2201/0039* (2013.01); *H04N 2201/0094* (2013.01); *H04N 2201/3208* (2013.01); *H04L 61/1594* (2013.01); *H04L 61/1523* (2013.01)

(58) Field of Classification Search
CPC .................... G06F 15/16; G06F 3/12
See application file for complete search history.

(56) References Cited

U.S. PATENT DOCUMENTS

| | | | |
|---|---|---|---|
| 2004/0212841 A1 | 10/2004 | Endo | |
| 2005/0063003 A1* | 3/2005 | Mishima et al. | 358/1.15 |
| 2006/0190622 A1* | 8/2006 | Kitada et al. | 709/245 |
| 2007/0223054 A1 | 9/2007 | Endo | |
| 2011/0002011 A1 | 1/2011 | Endo | |
| 2012/0182578 A1* | 7/2012 | Endo | 358/1.15 |
| 2013/0135678 A1 | 5/2013 | Endo | |

OTHER PUBLICATIONS

John Beatty, Web Services Dynamic Discovery (WS-Discovery), Apr. 2005, 2004-2005 Microsoft Corporation, Inc.*

* cited by examiner

*Primary Examiner* — Fred Guillermety
*Assistant Examiner* — Henok A Shiferaw
(74) *Attorney, Agent, or Firm* — K&L Gates LLP

(57) ABSTRACT

An image transmission system includes an image transmission apparatus and a client apparatus connected to a network. The image transmission apparatus distributes, via the network, a search message for searching for the client apparatus, transmits a request of the address information to the client apparatus that has transmitted a reply message for replying to the search message, displays one or more addresses included in address information that has been transmitted from the client apparatus, and transmits the image to the address among the one or more addresses. The client apparatus manages the address information, transmits the reply message to the image transmission apparatus that has transmitted the search message, and transmits the address information to the image transmission apparatus.

11 Claims, 9 Drawing Sheets

| ADDRESS | PUBLICATION |
|---|---|
| ooo@xxx | ☑ |
| //PC_01/share | ☑ |
| oo-xxxx-△△△△ | ☑ |
| ... | ... |

EDIT 62  END 63

61

Fig. 6

IMAGE TRANSMISSION SYSTEM FACILITATING ADDRESS REGISTRATION

INCORPORATION BY REFERENCE

This application is based upon, and claims the benefit of priority from, corresponding Japanese Patent Application No. 2013-016693, filed in the Japan Patent Office on Jan. 31, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an image transmission system including an image transmission apparatus that transmits an image.

BACKGROUND

In a first typical image transmission apparatus, an address, which is a destination of the image transmission, is directly inputted by a user via an input device. However, in this image transmission apparatus, an address has to be directly inputted from the input device each time an image is to be transmitted, which is troublesome for a user. Furthermore, an error is likely to occur when an address is an input device with a small screen.

A second typical image transmission apparatus that addresses the foregoing issue manages an address book using an internal unit and transmits an image to the address that has been selected, via an input device, from among a plurality of addresses included in the address book.

A typical image transmission system includes an image transmission apparatus and a Lightweight Directory Access Protocol (LDAP) server that manages an address book. The image transmission apparatus transmits an image to the address that has been selected, via an input device of the image transmission apparatus, from among a plurality of addresses included in the address book managed by the LDAP server.

In the second typical image transmission apparatus or in the typical image transmission system, addresses have to be registered in an address book in advance.

However, in the second typical image transmission apparatus or in the typical image transmission system, in the case where an address is registered in an address book via a network, for example, a user has to know, in advance, the information for accessing the image transmission apparatus over a network, such as the Internet Protocol (IP) address of the image transmission apparatus or the LDAP server. Accordingly, it is not easy for a user to register an address in an address book.

Furthermore, an address book managed by the second typical image transmission apparatus or by the LDAP server of the typical image transmission system can generally only be edited by a specified administrator having authority due to security. Accordingly, it is difficult for a user to register an address.

SUMMARY

The present disclosure relates to an image transmission system that facilitates registration of an address in address information used by an image transmission apparatus.

According to the present disclosure, an image transmission system includes an image transmission apparatus that transmits an image via a network; and a client apparatus that performs an address information management service as an application for managing address information including information on a transmission destination of the image, and is connected to the image transmission apparatus via the network.

The image transmission apparatus includes an operation unit, a display unit, a search message distribution device, an address information request device, an address display device, and an image transmission device. The search message distribution device distributes, via the network, a search message for searching for the client apparatus in accordance with an instruction inputted via the operation unit. The address information request device transmits a request of the address information to the client apparatus that has transmitted a reply message for replying to the search message. The address display device causes the display unit to display one or more addresses included in the address information that has been transmitted from the client apparatus. The image transmission device transmits the image to the address that has been selected in accordance with the instruction inputted via the operation unit, among the one or more addresses displayed on the display unit.

The client apparatus includes an address information management device, a reply message returning device, and an address information transmission device. The address information management device manages the address information. The reply message returning device transmits the reply message to the image transmission apparatus that has transmitted the search message. The address information transmission device transmits, to the image transmission apparatus that has requested the address information, the address information managed by the address information management device.

Additional features and advantages are described herein, and will be apparent from the following Detailed Description and the figures.

BRIEF DESCRIPTION OF THE FIGURES

All drawings are intended to illustrate some aspects and examples of the present disclosure. The drawings described are only schematic and are non-limiting, and are not necessarily drawn to scale.

FIG. 6 is a schematic diagram illustrating an example of addresses displayed on a display unit of the client apparatus

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
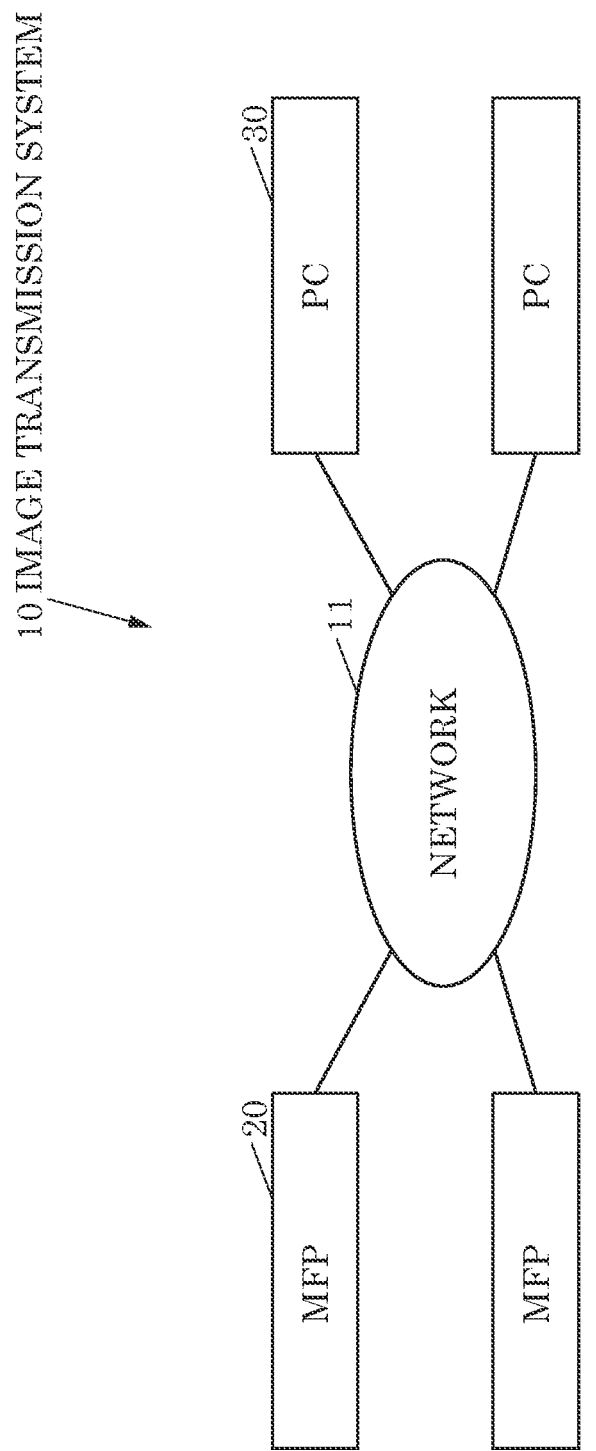
FIG. 1 is a block diagram illustrating a configuration of an image transmission system according to an embodiment of the present disclosure.

FIG. 1 is a block diagram illustrating a configuration of an image transmission system 10 according to an embodiment of the present disclosure.

As illustrated in FIG. 1, the image transmission system 10 includes a plurality of MFPs including an MFP 20 and a plurality of PCs including a PC 30. MFPs and PCs are connected to one another over a network 11, such as a local area network (LAN), so as to allow communication with one another. Each MFP is configured to transmit an image and constitutes an image transmission apparatus of the present disclosure. Each PC represents a client apparatus of the present disclosure.

The configuration of each of the multiple MFPs included in the image transmission system 10 is similar to the configuration of the MFP 20. Therefore, the MFP 20 is described below as a representative example of the multiple MFPs included in the image transmission system 10.

The configuration of each of the multiple PCs included in the image transmission system 10 is similar to the configuration of the PC 30. Therefore, the PC 30 is described below as a representative example of the multiple PCs included in the image transmission system 10.

Figure 2:
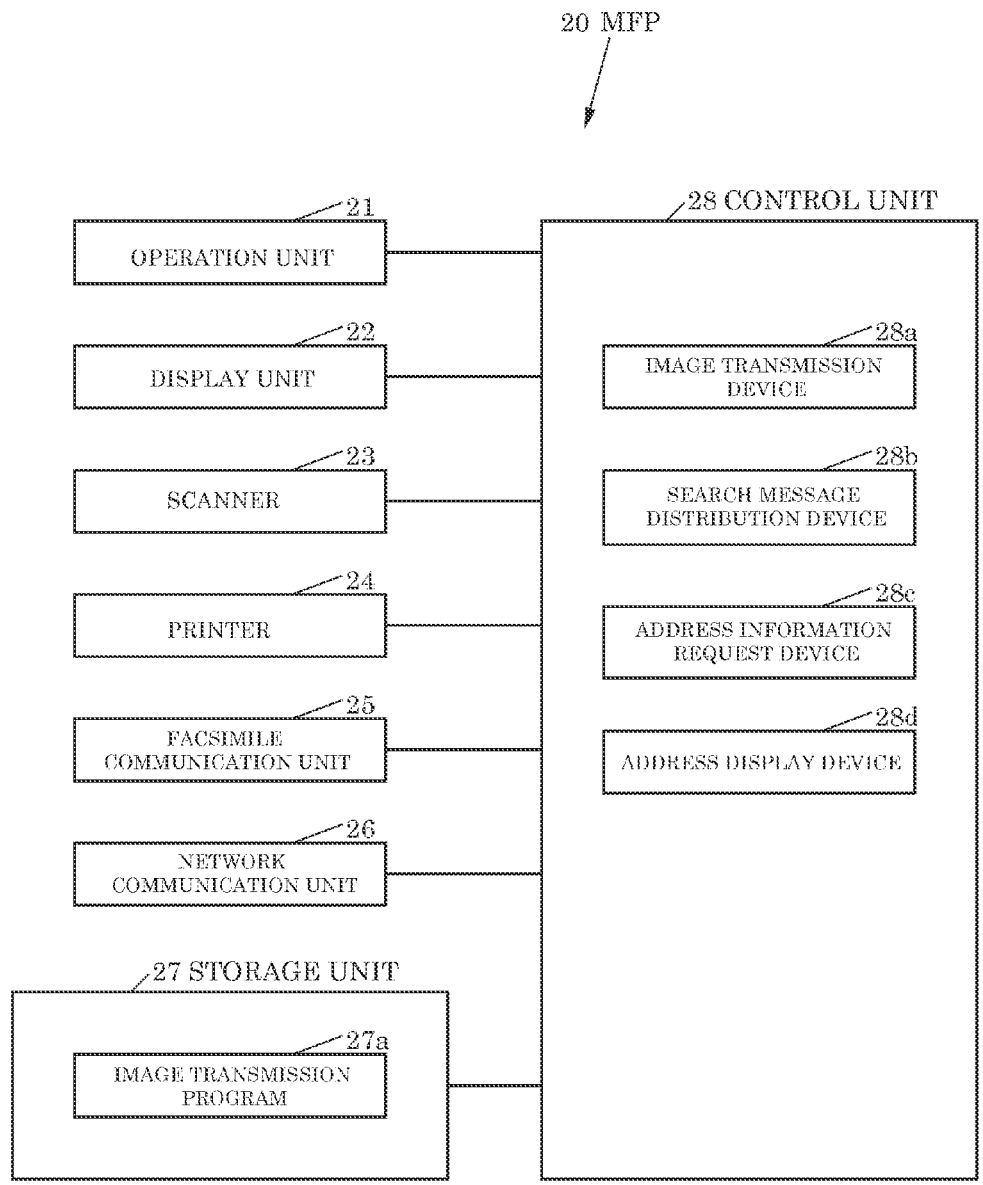
FIG. 2 is a block diagram illustrating a configuration of a multifunction peripheral (MFP) of the image transmission system.

FIG. 2 is a block diagram illustrating a configuration of the MFP 20.

As illustrated in FIG. 2, the MFP 20 includes an operation unit 21, a display unit 22, a scanner 23, a printer 24, a facsimile communication unit 25, a network communication unit 26, a storage unit 27, and a control unit 28. The operation unit 21 is an input device, such as a button, via which various operations performed by a user are inputted. The display unit 22 is a device, such as a liquid crystal display (LCD), which displays various types of information. The scanner 23 reads an image of a document. The printer 24 performs printing on a recording medium, such as a sheet. The facsimile communication unit 25 performs facsimile communication with a facsimile apparatus that is an external unit not illustrated using a communication line, such as a public telephone line. The network communication unit 26 communicates with an apparatus that is an external unit over the network 11 (see FIG. 1). The storage unit 27 is a device, such as an electrically erasable programmable read only memory (EEPROM) or a hard disk drive (HDD), which stores data of various types. The control unit 28 controls the entire MFP 20.

The operation unit 21 may include an input device that forms a touch panel together with the display unit 22.

The storage unit 27 stores an image transmission program 27a executed by the MFP 20. The image transmission program 27a may be installed in the MFP 20 when the MFP 20 is manufactured, installed in the MFP 20 from a recording medium, such as a Secure Digital (SD) card or a Universal Serial Bus (USB) memory, or installed in the MFP 20 from the network 11.

The control unit 28 includes a central processing unit (CPU), a read only memory (ROM) that stores a program and data of various types in advance, and a random access memory (RAM) that is used as a work space of the CPU, for example. The CPU is configured to execute the program stored in the ROM or in the storage unit 27.

The control unit 28 functions as an image transmission device 28a, a search message distribution device 28b, an address information request device 28c, and an address display device 28d. The image transmission device 28a transmits an image by executing the image transmission program 27a stored in the storage unit 27. The search message distribution device 28b distributes, throughout the network 11, a search message, which is a message used to search for the PC 30, in accordance with an instruction inputted via the operation unit 21. The address information request device 28c requests address information, the address information being information on the destination of the image transmission, from the PC 30 that has transmitted a reply message, which is a message used to reply to the search message. The address display device 28d makes the display unit 22 display one or more addresses included in the address information that has been transmitted by the PC 30.

Note that, as an image transmitted by the image transmission device 28a, any image may be specified, such as an image of a document read by the scanner 23, an image received by the facsimile communication unit 25 through facsimile communication, or an image received from an apparatus that is an external unit by the network communication unit 26.

Figure 3:
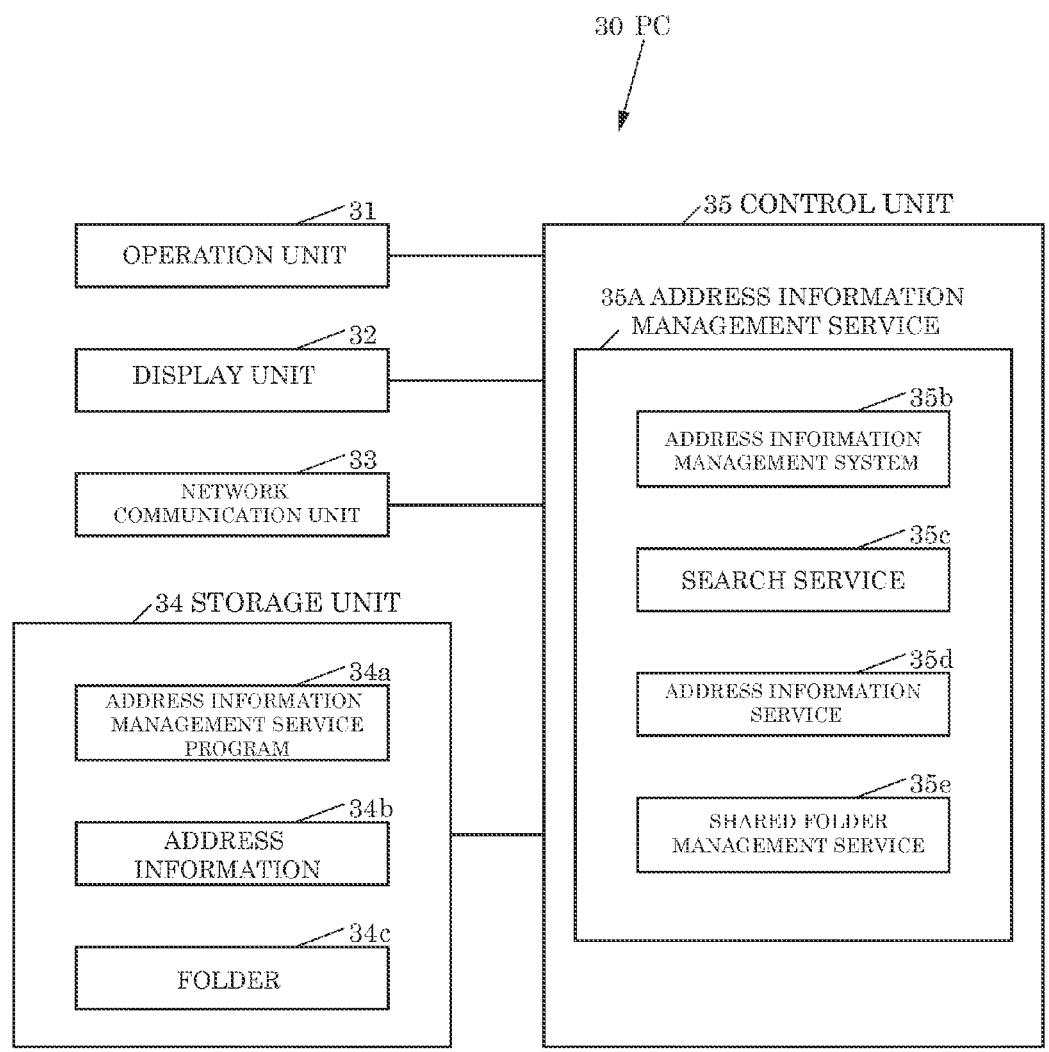
FIG. 3 is a block diagram illustrating a configuration of a client apparatus of the image transmission system.

FIG. 3 is a block diagram illustrating a configuration of the PC 30.

As illustrated in FIG. 3, the PC 30 includes an operation unit 31, a display unit 32, a network communication unit 33, a storage unit 34, and a control unit 35. The operation unit 31 is an input device, such as a mouse or a keyboard, via which various operations are inputted. The display unit 32 is a device, such as an LCD, which displays information of various types. The network communication unit 33 communicates with an apparatus that is an external unit over the network 11 (see FIG. 1). The storage unit 34 is a device, such as an HDD, which stores a program and data of various types. The control unit 35 controls the entire PC 30.

The storage unit 34 stores an address information management service program 34a that is an application program for managing address information 34b described below. The address information management service program 34a may be installed in the PC 30 when the PC 30 is manufactured, installed in the PC 30 from a recording medium, such as a compact disk (CD) or a digital versatile disk (DVD), or installed in the PC 30 from the network 11.

The storage unit 34 is able to store the address information 34b and a folder 34c.

The control unit 35 includes a CPU, a ROM that stores a program and data of various types in advance, and a RAM used as a work space of the CPU, for example. The CPU is configured to execute the program stored in the ROM or in the storage unit 34.

The control unit 35 functions as an address information management service 35a, which manages the address information 34b, by executing the address information management service program 34a stored in the storage unit 34. The address information management service 35a includes an address information management system 35b, a search service 35c, an address information service 35d, and a shared folder management service 35e. The address information management system 35b manages the address information 34b. The search service 35c is a reply message returning device that returns a reply message to the MFP 20 that has transmitted a search message. The address information service 35d transmits, to the MFP 20 that has requested address information, the address information managed by the address information management system 35b. The shared folder management service 35e generates a shared folder as an address to be included in the address information 34b managed by the address information management system 35b.

Next, operations of the image transmission system 10 are described.

First, operations performed in the case where the PC 30 automatically registers a shared folder of its own in the address information 34b as an address are described.

Figure 4:
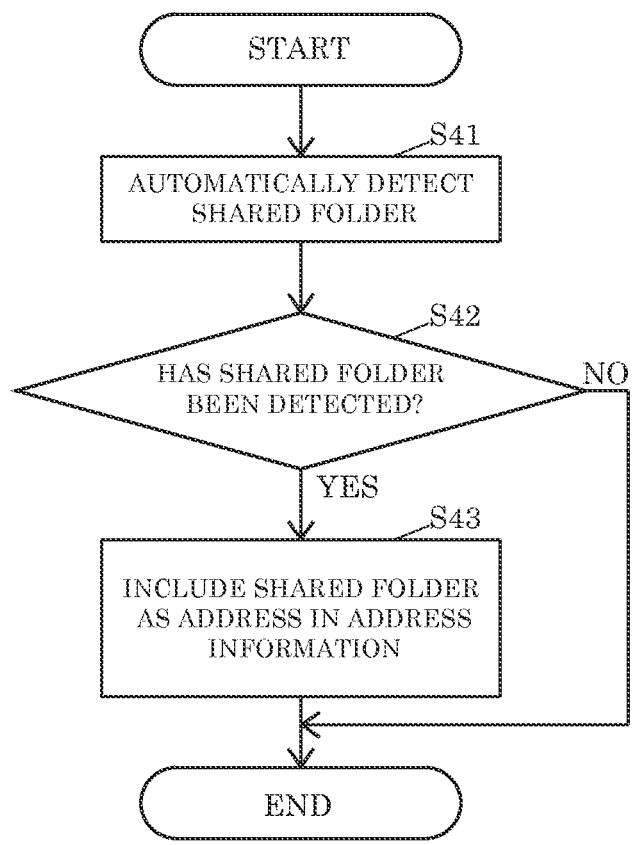
FIG. 4 is a flowchart illustrating operations of the client apparatus when automatically registering a shared folder as an address.

FIG. 4 is a flowchart illustrating operations of the PC 30 when automatically registering a shared folder in the address information 34b as an address.

The control unit 35 of the PC 30 performs the operations illustrated in FIG. 4 on a regular basis while the address information management service 35a is being activated.

As illustrated in FIG. 4, the address information management system 35b automatically detects a shared folder of the PC 30 (S41).

Next, the address information management system 35b determines whether or not a shared folder has been detected in S41 (S42).

If the address information management system 35b determines in S42 that a shared folder has not been detected, the address information management system 35b ends the operations illustrated in FIG. 4.

On the other hand, if the address information management system 35b determines in S42 that a shared folder has been detected, the address information management system 35b puts the shared folder detected in S41 in the address information 34b as an address (S43) and ends the operations illustrated in FIG. 4.

Next, operations performed in the case where the PC 30 registers an address are described.

Figure 5:
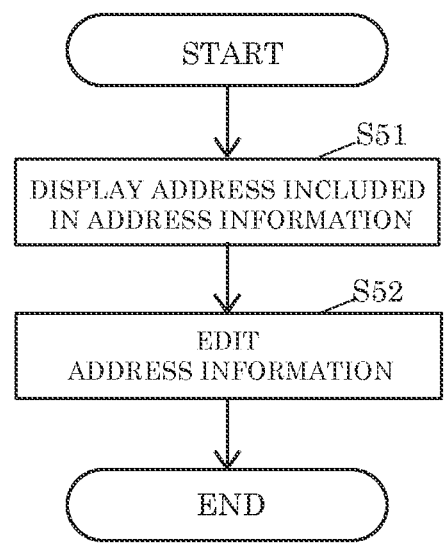
FIG. 5 is a flowchart illustrating operations of the client apparatus when registering an address.

FIG. 5 is a flowchart illustrating operations of the PC 30 when registering an address.

As illustrated in FIG. 5, the address information management system 35b of the PC 30 makes the display unit 32 display one or more addresses included in the address information 34b based on an instruction given by a user via the operation unit 31 (S51).

FIG. 6 is a schematic diagram illustrating an example of addresses displayed on the display unit 32 in S51.

In FIG. 6, addresses include an email address, a shared folder, a facsimile number, and the like. Note that a shared folder is not limited to a folder in the PC 30 and may be a folder in a PC other than the PC 30, the PC being included in the image transmission system 10. In a screen illustrated in FIG. 6, check boxes 61 each associated with an address and used for releasing the address, a button 62 for adding, changing, or deleting an address, and a button 63 for ending editing of an address are included.

In the screen illustrated in FIG. 6, a user is able to specify an address by checking a corresponding check box 61 via the operation unit 31 of the PC 30. Then, the address information management system 35b accepts specification of an address that is to be transmitted by the address information service 35d, among one or more addresses included in the address information 34b.

Furthermore, in the screen illustrated in FIG. 6, a user is able to add, change, or delete an address by pressing the button 62 via the operation unit 31 of the PC 30. In other words, the address information management system 35b is able to register an address in the address information 34b based on an instruction given by a user via the operation unit 31.

Furthermore, in the screen illustrated in FIG. 6, a user is able to end editing of an address by pressing the button 63 via the operation unit 31 of the PC 30.

As illustrated in FIG. 5, the address information management system 35b edits the address information 34b based on an instruction given by a user via the operation unit 31 (S52). More specifically, the address information management system 35b edits the address information 34b in response to operations performed on the check boxes 61 and the button 62 in the screen illustrated in FIG. 6. When the button 63 in the screen illustrated in FIG. 6 is pressed by a user, the address information management system 35b ends the operations illustrated in FIG. 5.

Next, operations performed when the PC 30 generates a shared folder are described.

Figure 7:
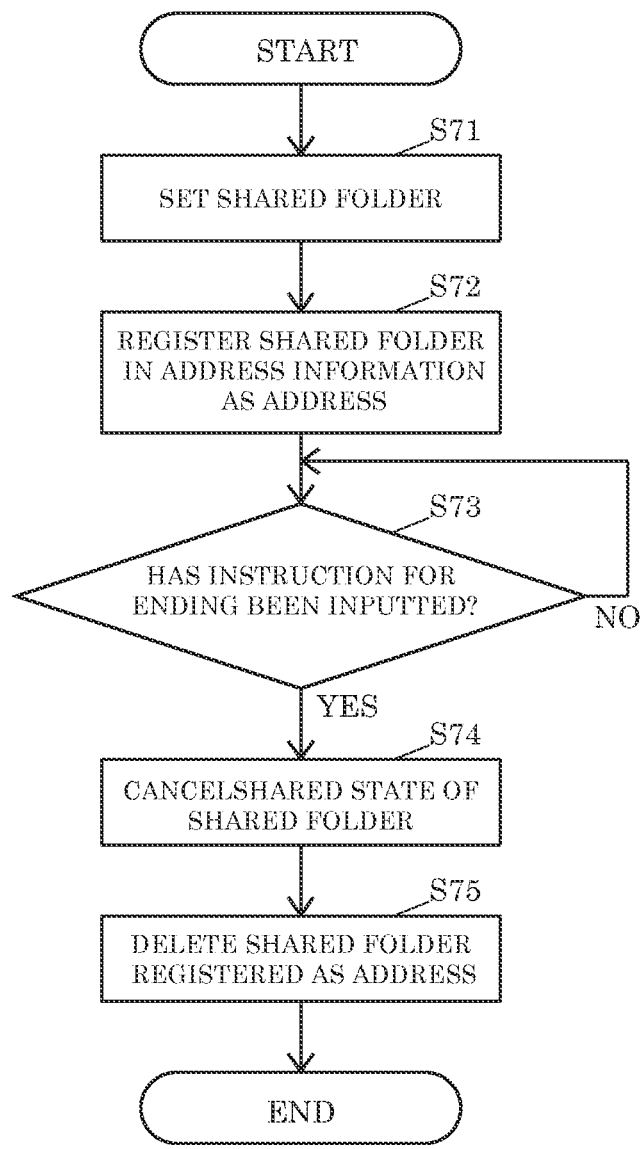
FIG. 7 is a flowchart illustrating operations of the PC when generating a shared folder.

FIG. 7 is a flowchart illustrating operations of the PC 30 when generating a shared folder.

As illustrated in FIG. 7, the shared folder management service 35e sets, based on an instruction given by a user via the operation unit 31, the folder 34c specified in the instruction as a shared folder (S71) and thereafter makes the address information management system 35b register the folder 34c in the address information 34b as an address (S72). Note that, as a method of generating a shared folder in S71, a method of generating a new shared folder in the PC 30 may be adopted in addition to a method of generating a shared folder by setting a folder that is already present in the PC 30 as a shared folder.

Next, the shared folder management service 35e repeatedly determines whether or not an instruction for ending the address information management service 35a is inputted via the operation unit 31 until it is determined that an instruction for ending the address information management service 35a has been inputted via the operation unit 31 (S73).

If the shared folder management service 35e determines that an instruction for ending the address information management service 35a has been inputted to the operation unit 31 in S73, the shared folder management service 35e cancels a shared state of the folder 34c (S74), makes the address information management system 35b delete the folder 34c registered as an address from the address information 34b (S75), and ends the operations illustrated in FIG. 7. In other words, the shared folder management service 35e cancels the shared state of a shared folder generated in S71 before the address information management service 35a ends.

Next, operations of the image transmission system 10 when an image is transmitted by the MFP 20 are described.

Figure 8:
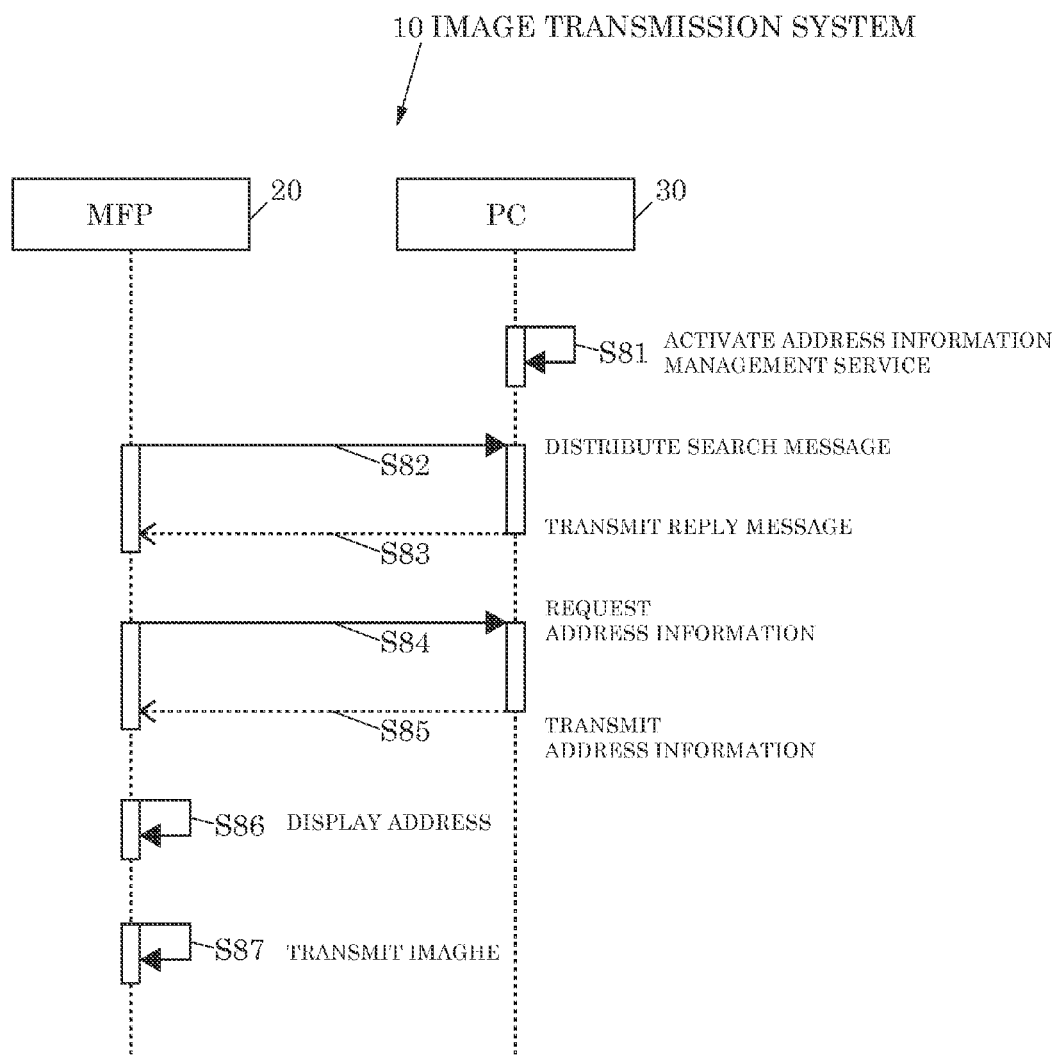
FIG. 8 is a sequence chart illustrating operations of the image transmission system when an image is transmitted by the MFP.

FIG. 8 is a sequence chart illustrating operations of the image transmission system 10 when an image is transmitted by the MFP 20.

A user having authority to operate the PC 30 inputs, via the operation unit 31 of the PC 30, an operation making the PC 30 activate the address information management service 35a. Then, as illustrated in FIG. 8, the control unit 35 of the PC 30 activates the address information management service 35a based on the input made by the user via the operation unit 31 (S81).

Next, the user moves to a place where the MFP 20 is located from a place where the PC 30 is located and inputs, via the operation unit 21 of the MFP 20, an operation of pressing an address selection button (not illustrated) displayed on the display unit 22 of the MFP 20. Then, the search message distribution device 28b of the control unit 28 of the MFP 20 distributes a search message used to search for the PC 30 throughout the network 11 via the network communication unit 26 (S82). For example, the search message distribution device 28b transmits a Probe message as a search message used to search for the PC 30, by using Web Services Dynamic Discovery (WS-Discovery). More specifically, the search message distribution device 28b transmits a Probe message used to search for the PC 30 in which the address information management service 35a is being activated, by using User Datagram Protocol (UDP) multicast for searching for the PC 30 in which the address information management service 35a is being activated.

When the search service 35c of the address information management service 35a of the PC 30 receives the search message distributed in S82 via the network communication unit 33, when the content of the search message corresponds to the search service 35c that has received the search message, the search service 35c returns a reply message to the MFP 20 that has transmitted the search message, via the network communication unit 33 (S83). For example, when the search message distributed in S82 is a Probe message based on WS-Discovery, the search service 35c returns a Probe Match message based on WS-Discovery as a reply message. The MFP 20 is thus able to recognize the location of the PC 30.

When the address information request device 28c of the control unit 28 of the MFP 20 receives, via the network communication unit 26, the reply message returned in S83, the address information request device 28c requests, via the network communication unit 26, address information from the PC 30 that has transmitted the reply message (S84).

When the address information service 35d of the address information management service 35a of the PC 30 receives, via the network communication unit 33, the request for address information made in S84, the address information service 35d transmits, via the network communication unit 33, address information based on the address information 34b managed by the address information management system 35b to the MFP 20 that has requested address information in S84 (S85). Here, the address information management system 35b passes to the address information service 35d only the address, among one or more addresses included in the address information 34b, specification of which has been accepted using a corresponding checkbox 61 in the screen illustrated in FIG. 6, as an address to be transmitted by the address information service 35d. Therefore, the address information service 35d transmits in S85 address information only including the address that has been passed by the address information management system 35b.

When the address display device 28d of the control unit 28 of the MFP 20 receives the address information transmitted in S85 via the network communication unit 26, the address display device 28d makes the display unit 22 display the address included in the address information (S86).

Figure 9:
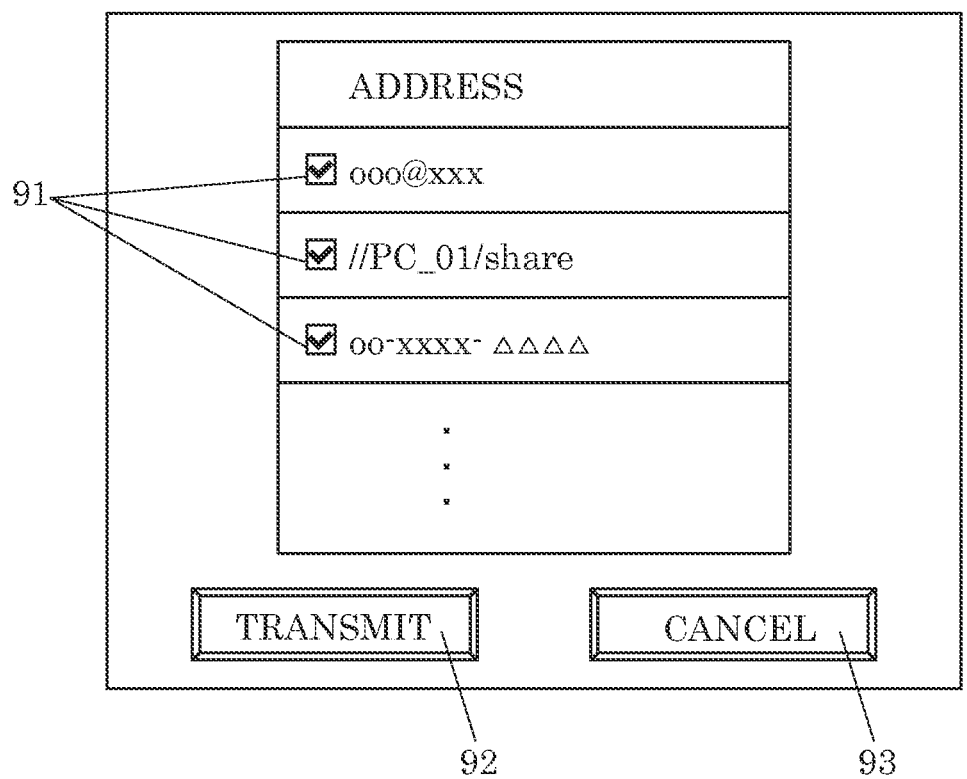
FIG. 9 is a schematic diagram illustrating an example of addresses displayed on a display unit of the MFP.

FIG. 9 is a schematic diagram illustrating an example of addresses displayed on the display unit 22 in S86.

In FIG. 9, addresses include an email address, a shared folder, a facsimile number, and the like. Note that a shared folder is not limited to a folder in the PC 30 and may be a folder in a PC other than the PC 30, the PC being included in the image transmission system 10. In the screen illustrated in FIG. 9, check boxes 91 each associated with an address and used for selecting the address, a button 92 for transmitting an image to an address selected using a corresponding checkbox 91, and a button 93 for canceling transmission of an image are included.

A user selects an address by checking a corresponding checkbox 91 via the operation unit 21 of the MFP 20 and thereafter presses the button 92 via the operation unit 21, thereby being able to instruct the MFP 20 to transmit an image.

When a user selects an address displayed on the display unit 22 in S86 and instructs the MFP 20 to transmit an image, the image transmission device 28a of the control unit 28 of the MFP 20 transmits the image to the address that has been selected in accordance with the instruction inputted via the operation unit 21, among the addresses displayed on the display unit 22, as illustrated in FIG. 8 (S87). Here, if the address is an email address, the image transmission device 28a transmits the image to the email address via the network communication unit 26 by email. If the address is a shared folder, the image transmission device 28a writes the image in the shared folder via the network communication unit 26. If the address is a facsimile number, the image transmission device 28a transmits, by facsimile, the image to the facsimile number via the facsimile communication unit 25.

Note that, as a communication system between the MFP 20 and the PC 30, various systems, such as a Web service or Representational State Transfer (REST), are capable of being adopted.

As described above, in the image transmission system 10, the MFP 20 is able to locate the PC 30 in which the address information management service 35a is being activated, by using a search message and a reply message (S81 to S83) and therefore the user does not have to know in advance information, such as the IP address of the PC 30, for accessing the PC 30 from the MFP 20 over the network 11. Accordingly, the image transmission system 10 easily makes the address information 34b managed by the PC 30 available to the MFP 20. Furthermore, in the image transmission system 10, as long as the PC 30 is configured to activate the address information management service 35a, the MFP 20 transmits the image (S87) to an address selected by a user among one or more addresses included in the address information 34b managed by the PC 30 even if the PC 30 is easily operated by a user. Therefore, it is possible to facilitate registration of an address in address information used by the MFP 20.

In the image transmission system 10, when the PC 30 is used by a single user, for example, it is possible to make the display unit 22 of the MFP 20 display only one or more addresses included in the address information 34b managed by the PC 30. Therefore, it is possible to increase convenience compared with a configuration when a user has to find an address necessary for the user by performing every operation, such as sorting or retrieving, from among thousands of addresses included in address information, most of which are addresses irrelevant to the user, such as address information shared by multiple users, for example.

In the image transmission system 10, only an address specified by the user (S52) among one or more addresses included in the address information 34b is displayed (S86) on the display unit 22 of the MFP 20. Therefore, it is possible to increase security compared with a configuration in which all addresses included in the address information 34b are constantly displayed on the display unit 22 of the MFP 20.

Note that, the image transmission system 10 may be configured such that all addresses included in the address information 34b are constantly displayed on the display unit 22 of the MFP 20.

In the image transmission system 10, a shared folder of the PC 30 in which the address information management service 35a is being activated is automatically include in the address information 34b as an address (S43). Therefore, it is possible that an image is transmitted, by the MFP 20, to a shared folder of the PC 30 in which the address information management service 35a is being activated.

In the image transmission system 10, a shared folder is generated in the PC 30 (S71) as an address to which an image is to be transmitted by the MFP 20. Therefore, it is possible that an image is transmitted by the MFP 20 to the shared folder.

In the image transmission system 10, the shared state of a shared folder that has been generated by the PC 30 performing the address information management service 35a is canceled (S74) before the address information management service 35a ends. Therefore, it is possible to temporarily generate a shared folder in the PC 30, to which an image is capable of being transmitted by the MFP 20.

Note that, the image transmission system 10 does not have to be configured such that the shared state of a shared folder that has been generated by the PC 30 performing the address information management service 35a is cancelled before the address information management service 35a ends.

In the image transmission system 10, as long as the address information management service is being activated in a PC, it is possible to make the display unit 22 of the MFP 20 display one or more addresses included in address information managed by the PC even if the PC is other than the PC 30. In other words, in the image transmission system 10, it is possible to make the display unit 22 of the MFP 20 simultaneously display addresses included in pieces of address information respectively managed by a plurality of PCs.

On the other hand, it is assumed that the image transmission system 10 is configured such that identification information of the search service 35c is put in a search message distributed by the MFP 20 in S82 and the search service 35c that has received the search message returns a reply message to the MFP 20 that has transmitted the search message including identification information of the search service 35c (S83). Then, it is possible to make the display unit 22 of the MFP 20 display only one or more addresses included in the address information 34b managed by the PC 30 that is identified using identification information included in a search message, among PCs in which the address information management service is being activated. In other words, in the image transmission system 10, it is possible to facilitate selection of an address made by the user compared with a configuration in which one or more addresses included in address information managed by any PC in which the address information management service is being activated are displayed on the display unit 22 of the MFP 20.

Note that the identification information may be identification information of the PC 30, such as an IP address or a serial number. Furthermore, the identification information may be an identifier (ID) and a password of the user that are used when the user logs in to the MFP 20 from the PC 30, for example. In the case where the MFP 20 encrypts the ID and password by using a specific law when the MFP 20 puts the ID and password in a search message, it is possible to increase security when the identification information is distributed throughout the network 11. The search service 35c is able to recognize the ID and password by decoding the ID and password using the law after receiving the identification information.

In the image transmission system 10, it is possible to make display units of a plurality of MFPs simultaneously display one or more addresses included in the address information 34b managed by the PC 30 in which the address information management service 35a is being activated.

The image transmission apparatus of the present disclosure is an MFP in an embodiment, however, the image transmission apparatus may be an image transmission apparatus other than an MFP, such as a dedicated facsimile machine.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

The invention is claimed as follows:

1. An image transmission system comprising:
an image transmission apparatus configured to transmit an image via a network; and
a client apparatus configured to perform an address information management service as an application for managing address information that includes information on a transmission destination of the image, and connected to the image transmission apparatus via the network,
wherein the image transmission apparatus includes:
an operation unit,
a display unit,
a search message distribution device configured to distribute, via the network, a Probe message as a search message for searching for the client apparatus in which the address information management service is being activated, via User Datagram Protocol (UDP) multicast, for searching for the client apparatus in which the address information management service is being activated by using Web Services Dynamic Discovery (WS-Discovery), based on an instruction inputted via the operation unit,
an address information request device configured to transmit a request of the address information to the client apparatus that has transmitted a Probe Match message based on the WS-Discovery as a reply message for replying to the search message,
an address display device configured to cause the display unit to display one or more addresses included in the address information that has been transmitted from the client apparatus, and
an image transmission device configured to transmit the image to the address that has been selected based on the instruction inputted via the operation unit, among the one or more addresses displayed on the display unit,
wherein the client apparatus includes:
an address information management device configured to manage the address information,
a reply message returning device configured to transmit the reply message to the image transmission apparatus that has transmitted the search message, and
an address information transmission device configured to transmit, to the image transmission apparatus that has requested the address information, the address information managed by the address information management device, and
wherein the search message includes identification information of the reply message returning device,
the reply message returning device is configured to return the reply message to the image transmission apparatus that has transmitted the search message including the identification information of the reply message returning device, and the address display device is configured to cause the display unit to display only one or more addresses included in the address information that is managed by the client apparatus that is identified using the identification information included in the search message, among the plurality of the client apparatuses in which the address information management service is being activated.

2. The image transmission system according to claim 1, wherein the address information management device is configured to accept specification of the address to be transmitted by the address information transmission device among the one or more addresses included in the address information.

3. The image transmission system according to claim 1, wherein the address information management device is configured to detect a shared folder of the client apparatus and include the shared folder in the address information as one of the addresses.

4. The image transmission system according to claim 1, wherein the client apparatus further includes a shared folder generation device, and the shared folder generation device is configured to generate a shared folder as one of the addresses included in the address information.

5. The image transmission system according to claim 4, wherein the shared folder generation device is configured to cancel, before the address information management service ends, a shared state of the shared folder that has been generated.

6. An image transmission apparatus comprising:

an operation unit;

a display unit;

a search message distribution device configured to distribute, via a network, a Probe message as a search message for searching for a client apparatus in which the address information management service is being activated, via User Datagram Protocol (UDP) multicast, for searching for the client apparatus in which the address information management service is being activated by using Web Services Dynamic Discovery (WS-Discovery), based on an instruction inputted via the operation unit;

an address information request device configured to request address information from the client apparatus that has transmitted a Probe Match message based on the WS-Discovery as a reply message for replying to the search message;

an address display device configured to cause the display unit to display one or more addresses included in the address information that has been transmitted by the client apparatus; and an image transmission device configured to transmit an image to the address that has been selected in accordance with an instruction inputted via the operation unit, among the one or more addresses displayed on the display unit, wherein the search message includes identification information of the client apparatus, the client apparatus is configured to return the reply message to the image transmission apparatus that has transmitted the search message including the identification information of the client apparatus, and the address display device is configured to cause the display unit to display only one or more addresses included in the address information that is managed by the client apparatus that is identified using the identification information included in the search message, among the plurality of the client apparatuses in which the address information management service is being activated.

7. An image transmission method performed by an image transmission system including an image transmission apparatus that transmits an image via a network and a client apparatus that performs an address information management service, as an application for managing address information that includes information on a transmission destination of the image, and is connected to the image transmission apparatus via the network, the image transmission method comprising:

via the image transmission apparatus, distributing, via the network, a Probe message as a search message, including identification information of the client apparatus, for searching for the client apparatus in which the address information management service is being activated, via User Datagram Protocol (UDP) multicast, for searching for the client apparatus in which the address information management service is being activated by using Web Services Dynamic Discovery (WS-Discovery);

requesting the address information from the client apparatus that has transmitted a Probe Match message based on the WS-Discovery as a reply message for replying to the search message;

displaying only one or more addresses included in the address information that has been transmitted by the client apparatus and that is managed by the client apparatus that is identified using the identification information of the client apparatus included in the search message, among the plurality of the client apparatuses in which the address information management service is being activated; and transmitting the image to the address that has been selected among the one or more addresses that have been displayed, and via the client apparatus, managing the address information;

transmitting the reply message to the image transmission apparatus that has transmitted the search message including the identification information of the client apparatus; and transmitting, to the image transmission apparatus that has requested the address information, the address information that is managed.

8. The image transmission method according to claim 7, comprising:

via the client apparatus, accepting specification of the address to be transmitted by the address information transmission device among the one or more addresses included in the address information.

9. The image transmission method according to claim 7, comprising:

via the client apparatus, detecting a shared folder of the client apparatus; and including the shared folder in the address information as one of the addresses.

10. The image transmission method according to claim 7, comprising:

via the client apparatus, generating a shared folder as one of the addresses included in the address information that is managed.

11. The image transmission method according to claim 7, comprising:

via the client apparatus, canceling, before the address information management service ends, a shared state of the shared folder that has been generated.

* * * * *